United States Patent [19]

McMillin

[11] 3,831,009

[45] Aug. 20, 1974

[54] TIMING SYSTEM FOR OPTICALLY SCANNED DOCUMENTS

[75] Inventor: John V. McMillin, Iowa City, Iowa

[73] Assignee: Westinghouse Learning Corporation, Iowa City, Iowa

[22] Filed: Aug. 3, 1973

[21] Appl. No.: 385,393

[52] U.S. Cl. .......................... 235/61.11 E, 250/555
[51] Int. Cl. ......................... G06k 7/016, G08c 9/06
[58] Field of Search .............. 235/61.11 E, 61.11 D; 250/555, 566; 35/48; 178/17 A, 17 B; 360/2, 51

[56] References Cited

UNITED STATES PATENTS

| | | | |
|---|---|---|---|
| 3,474,232 | 10/1969 | Hearn et al. | 235/61.11 E |
| 3,496,342 | 2/1970 | Milford | 235/61.11 E |
| 3,627,990 | 12/1971 | Sallach | 235/61.11 E |
| 3,708,655 | 1/1973 | Schanne | 235/61.11 E |
| 3,752,961 | 8/1973 | Torrey | 235/61.11 E |

*Primary Examiner*—Daryl W. Cook
*Attorney, Agent, or Firm*—James C. Nemmers

[57] ABSTRACT

A system for use in document readers of the type in which manually-entered responses in predetermined data response areas on a document are optically scanned or read electronically as the document is conveyed at high speed. The data response areas are arranged in regularly spaced rows, and the timing of the scanning of each data row is usually controlled solely by preprinted regularly-spaced indicator marks along an edge of each document. The system of the invention measures the time interval between the initial indicator marks by counting timed pulses at a predetermined rate and these pulses are then used as a reference to control scanning of the data rows in the event that the timing indicator marks fail to produce the necessary signals to control the scanning of the data rows. The system also provides for continuous synchronizing of the timed pulses with those produced directly from the indicator marks.

11 Claims, 3 Drawing Figures

TIMING SYSTEM FOR OPTICALLY SCANNED DOCUMENTS

BACKGROUND OF THE INVENTION

This invention relates to the processing of data and more particularly to apparatus for optically scanning and reading documents containing manually-entered data. Most document scanners of the type to which the invention relates require that each document contain a column of pre-printed timing or indicator marks along one edge of the document. These timing marks are usually small black rectangles evenly spaced in a column oriented in the direction that the document moves through the scanner. The documents also contain data response areas pre-printed in rows and columns, and the timing marks are located so that there is one such timing mark for each row of data to be scanned. This track of timing marks is optically scanned by a special detection channel in the scanner, and the channel generates a separate and distinct output pulse for each timing mark detected. Each output pulse generated by the timing track channel is used by the scanner logic to identify a row of the document where the scanner should strobe for data. Usually, the scanner, or a computer operatively connected to the output of the scanner, counts and accumulates the total number of timing marks detected, and the accumulated total is compared to the number actually pre-printed on the document to verify that all of the timing marks have been detected. Such a system works extremely well as long as the timing marks are properly and accurately printed and are in no way interfered with or obscured. However, this type of document is often used as the answer sheet for a variety of tests administered to millions of school children annually. Unfortunately, the timing mark track is a tempting area for conscious or unconscious "doodling." Not infrequently, additional marks are pencilled in between timing marks or the spaces between two or more timing marks are filled in with pencil marks. When this occurs, there results a considerable loss of efficiency in machine reading of the documents since such documents are rejected by the scanner and must be manually removed and the "doodling" erased or corrected so that the document can be re-read by the scanner. In some cases, such documents must be manually read. Doodling rates can run as high as 4 – 6 percent where documents are used as answer sheets in mass-test batteries administered to elementary school children.

The doodling results in a low error-count where the "doodle" is large enough to entirely fill in the blank space between two or more adjacent timing marks. A high error-count will result where the doodle is large enough to be detected by the document scanner but small enough in size so that it falls between two adjacent timing marks leaving blank spaces on either side of the doodle. Also, a high error-count will result if an additional mark is doodled just ahead of or just behind the first or last timing mark in the timing track area. Of course, excessive and random doodling on a given document can cause errors of both types which can exactly offset each other if the number of high and low errors are the same. To avoid this, special pre-printed marks can be located in other areas of the document and used as a check to insure that the doodles have not exactly cancelled out each other.

Although minor compared to the "doodling" problem, another inaccuracy in machine reading can result from a quality control problem in the printing of the documents. Some of the timing marks may be marginally light so that the scanner timing track detector fails to read one or more marks from the track. Imperfections in the paper stock such as pinholes, dark spots, etc. can at times cause an extra timing mark to be generated by the timing track channel resulting in a high error count. In the case of either high or low error counts, the data read by the scanner will produce erroneous results.

Other types of known document scanners derive the timing for strobing of the data rows by using a tachometer type pulse-generating device attached to the drive-capstans of the scanner. However, if a document has "tight" row spacing (6 to 12 rows per inch) such devices are unsatisfactory because the paper stock can change in length due to ambient humidity changes and produce a cumulative error which at the trailing edge of the document can be almost a full data row width even though the document length has varied only 1 percent due to humidity changes.

Thus, the use of pre-printed timing mark tracks directly on the sheet which are optically scanned to produce the timing is the most reliable method for documents containing a high density of data, and these high density documents are commonly employed in the large scale mass-test batteries.

In Lindquist U.S. Pat. No. 3,503,850 issued Mar. 24, 1970, entitled "Data Sensing System For Document Scanner," ther is shown a system for correcting doodles of the type in which timing marks are bridged. This system improves the accuracy and efficiency of machine reading but requires additional sensors to be packaged into the scan head in a direction perpendicular to the principal axis of the scan head. In order to achieve substantial corrective capability using this system, the mechanical and space problems become difficult. Also, such a system is suitable for only a given row spacing or some integral multiple thereof, and cannot be used for intermixing of documents having different row spacing without changing the scan head.

Because accuracy in machine reading of data-containing documents is extremely important and because doodling cannot be eliminated, there is a need for an improved system for correcting the "doodling" problem so that a single reader with the same scan head can be used for documents with different row spacing and will correct for both high and low error count "doodles."

SUMMARY OF THE INVENTION

The system of the invention includes a pulse generator and digital logic which measures the time interval by counting and storing pulses generated at a predetermined rate between the first and second timing marks on each document. This reference count is then used as the correct value of the row spacing and, where necessary, can be utilized to generate an output pulse that simulates an output pulse from the scan track channel in the event that a timing mark is not detected. The system further includes logic to automatically synchronize the simulated timing marks by resetting the pulse counter used to measure the time interval between marks and thereby preventing the train of simulated pulses from drifting away from the actual timing marks.

In this way, an accurate scan of each row of data will be initiated by the output from either the actual timing mark channel or the simulated timing mark counter. The system of the invention therefore practically eliminates rejection or erroneous reading of documents because of doodling in the area of the timing mark track.

DESCRIPTION OF THE PREFERRED EMBODIMENT OF THE INVENTION

Figure 1:
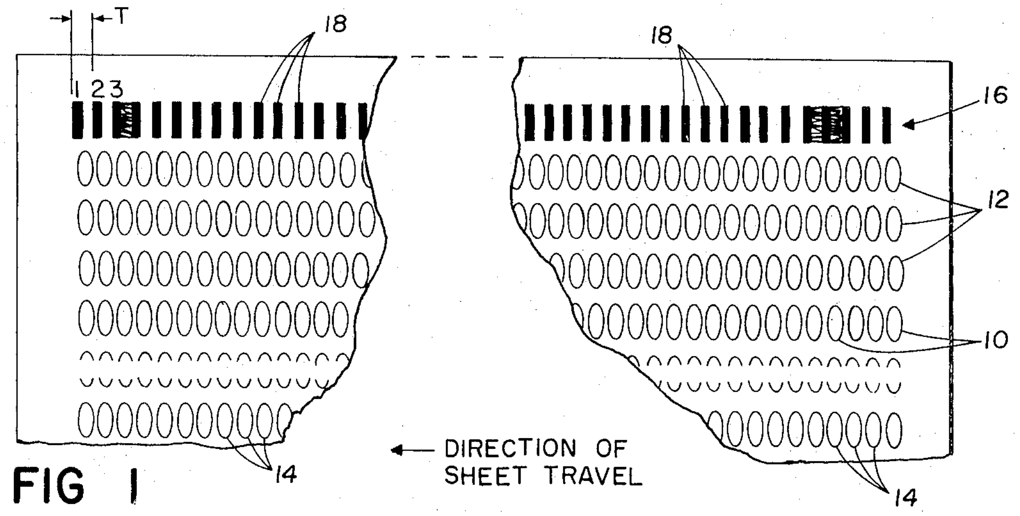
FIG. 1, illustrates one type of data-containing document and shows the timing marks in a column along the side edge of the document.

An early version of apparatus of the general type to which this invention relates is disclosed in U.S. Pat. No. 3,050,248, issued Aug. 21, 1962 to Everet F. Lindquist. In machines of this type, as well as most machines which automatically scan and "read" data from documents, indicator or timing marks must be printed along the edge of each document to "tell" the machine when to read or strobe a data area or row. In FIG. 1, there is illustrated a portion of one type of such a document, the document illustrated being of a type for recording information such as answers to tests. Each document customarily has a plurality of preprinted data response areas 10 arranged in columns 12 and rows 14. Printed along an edge, in this case a side edge, is a timing track 16 arranged parallel to columns 12, the timing track 16 containing a plurality of equally spaced-apart timing marks 18, there being one such mark for each of the data rows 14. As indicated in FIG. 1, the timing marks 18 are printed slightly ahead of each data row 14 to allow time for each mark 18 to be detected, and marks 18 are used to produce an output signal that will tell the data sensors when to "read."

Figure 3:
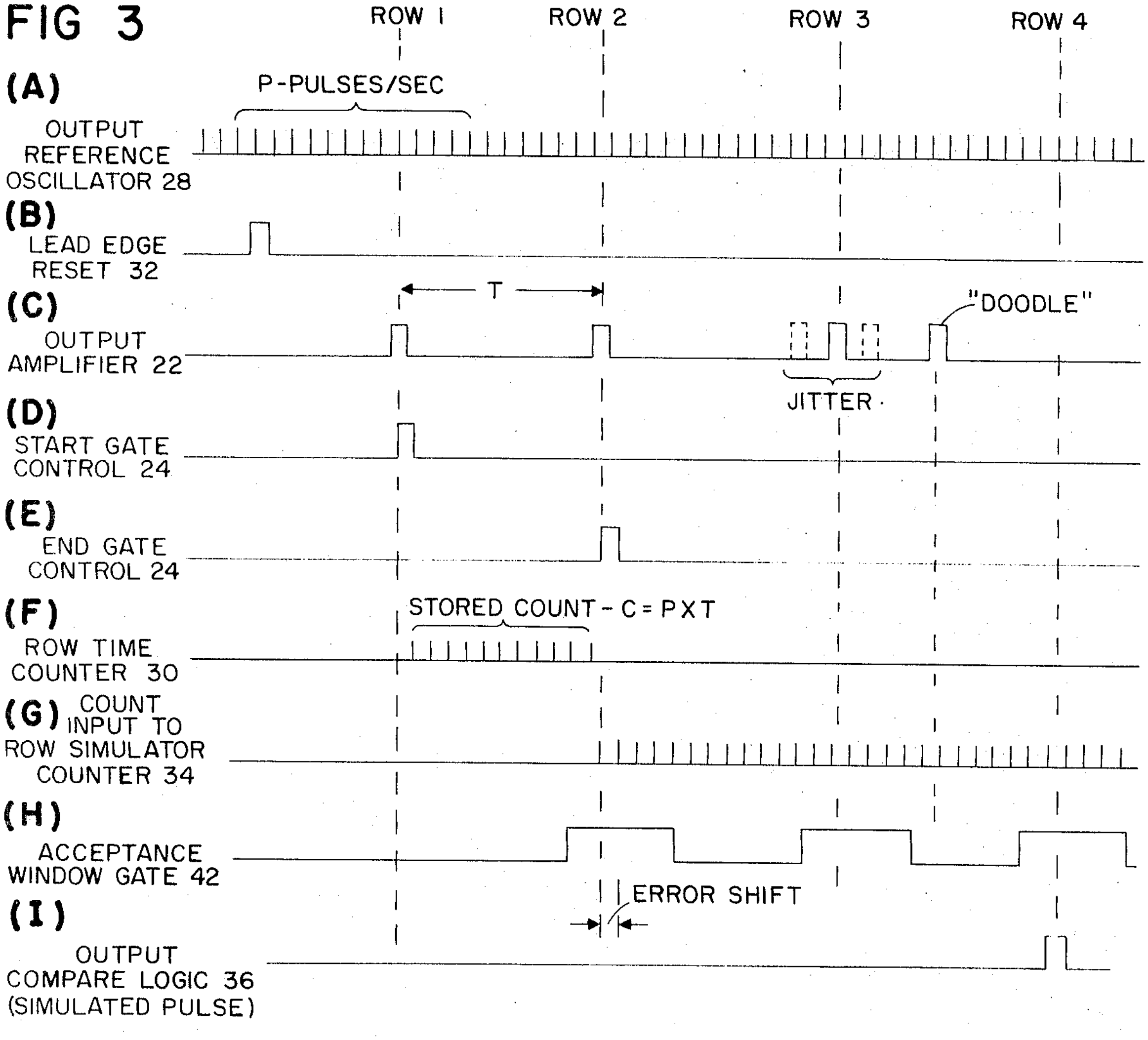
FIG. 3, illustrates graphically various functions in the system comparing these on a time reference basis.
Figure 2:
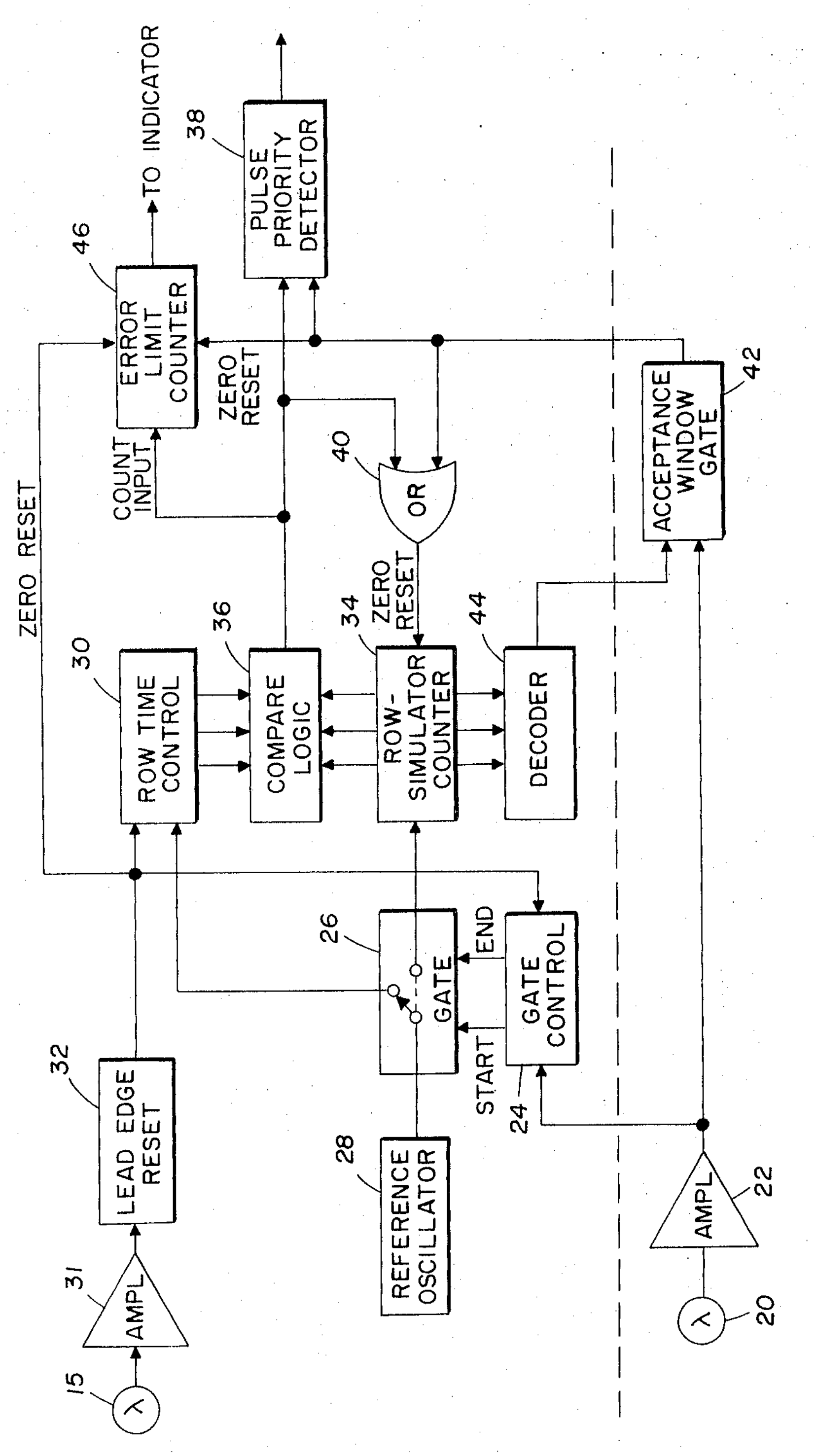
FIG. 2, is a logic-schematic diagram illustrating the circuitry for carrying out the principles of the invention.

In order to strobe or read the data contained on the document, the scanner is provided with a plurality of sensors arranged in a line transverse to the direction of travel of the document through the apparatus, there being one such sensor for each column 12. Such sensors are preferably photo transistors the characteristics of which change when the light reflected or transmitted to them varies. One such photo transistor 15 is shown in FIG. 2, the photo transistor 15 performing the additional function of document lead edge detection as more fully explained hereinafter. As is well-known, each data row is illuminated as it passes beneath the data sensors, the "reading" of each data row being controlled by a signal normally produced by the detection of a timing mark 18. The presence or absence of a timing mark 18 is detected by a data sensor, preferably also a photo transistor 20, which is mounted in the same scan-head and in alignment with the other data sensors which read the data response areas 10. The photo transistor 20, of course, is mounted in the scan-head in line with the timing track 16 so that each of the timing marks 18 passes successively beneath the photo transistor 20 as the document is conveyed through the scanner. Since the timing marks 18 are separated by blank spaces, the intensity of light transmitted or reflected to photo transistor 20 varies thus producing a change in current in response to the change in light intensity. This change in current is used to produce an output pulse from photo transistor 20 each time a timing mark 18 is detected. The photo transistor 20 is coupled to amplifier 22, and detection of a timing mark by photo transistor 20 causes the output of amplifier 22 to be a positive pulse referenced to ground. The output of amplifier 22 is coupled to a gate control 24 which produces a digital output that is coupled to gate 26. The input of gate 26 is also coupled to a reference oscillator 28 which runs continuously and produces output pulses at a predetermined rate of "P" pulses per second (see FIG. 3). These output pulses are selectively gated by gate 26 to the input of a row-time counter 30 which is capable of counting and storing the pulses. In addition, row-time counter 30 is connected to lead edge reset logic 32 which resets the counter 30 to zero each time that the photo transistor 15 detects the lead edge of a document to be read and produces an output to amplifier 3131 which is coupled to the input of the lead edge reset logic 32. The output from lead edge reset logic 32 is also coupled to gate control 24 to activate control 24. With the row-time counter 30 reset to zero by the lead edge reset logic 32, detection of the first timing mark 18 in the timing track 16 by photo transistor 20 will produce an output to gate control 24 which will in turn "switch" the output of gate 26 and oscillator 28 to the row-time counter 30. Reference oscillator 28 is continuously producing output pulses, and when the output of gate 26 is coupled to row-time counter 30 at the time the first timing mark 18 is detected, counter 30 will start counting the pulses. When the second timing mark 18 is detected by photo transistor 20, gate control 24 will switch the output of gate 26 to simulator counter 34 and thus stop the flow of pulses from oscillator 28 to the row-time counter 30. Row-time counter 30 will store the counted pulses "C" and therefore measure the time interval "T" in pulses produced by oscillator 28. between the first two timing marks 18.

When the gate control 24 receives the second pulse from amplifier 22 (thus indicating that the second timing mark 18 has been detected by photo transistor 20) and the output of gate 26 is thus switched to row-simulator counter 34, counter 34 will start counting the pulses received from the same reference oscillator 28 that produced pulses to the row-time counter 30. Both the row-time counter 30 and row-simulator counter 34 are connected to comparative logic 36 which receives the stored pulse-count C made between data rows 1 and 2 by the row-time counter 30 and compares the count C with the pulses P being counted by row-simulator counter 34 following detection of the row-2 timing track mark 18. When the number of pulses P counted by row-simulator counter 34 equals the number of pulses C previously counted and stored by row-time counter 30 between data rows 1 and 2, the comparative logic 36 will produce an output pulse to the pulse priority detector 38. This output pulse simulating detection of the third timing mark 18 is then used to tell the scanner to "read" in the event that no pulse is produced by photo transistor 20 being a timing mark 18 is not detected at data row 3. As described hereinafter, pulse priority detector 38 will produce an output pulse to tell the scanner to "read" at the time the first pulse is received either from comparative logic 36 or directly from photo transistor 20 after passing through the acceptance window gate 42. In other words, the first pulse, timewise, to arrive at the pulse priority detector 38 from either the "simulated" pulse logic or the "direct" pulse logic locks out the second pulse to arrive for that particular data row. (The "simulated" pulse logic is that shown in FIG. 2 above the dotted line while the "direct" pulse logic is that shown below the line.)

In the event that pulses should arrive simultaneously from the simulated logic and the direct logic, only a single output pulse will be generated by the pulse priority detector 38.

The first pulse to arrive at the priority detector 38 will also be gated through OR gate 40 to reset the row-simulator counter 34 to zero. The row-simulator counter 34 then begins to accumulate a new count from the oscillator 28, and this new count will continue until the count reaches the count of the row-time counter 30 which has been stored and inputted to the comparative logic 36. If a pulse from the simulated logic arrives first at priority detector 38, and if after this occurs a pulse is received from the direct logic, detector 38 will not produce this second pulse as an output to the scanner logic. However, the late pulse from the direct logic will be gated through OR gate 40 to produce a second zero-reset pulse to the row-simulator counter 34. This removes the pulse count that had accumulated in the row-simulator counter 34 since it was earlier reset by the first pulse from the simulated logic. Thus, if a timing mark 18 is actually detected for a data row, the row-simulator counter 34 always begins the count toward generating the next simulated row mark from the time reference point of the actual timing mark 18 detected. This dual-reset method in which the row-simulator counter 34 is reset either by a pulse from the direct logic or by a pulse produced by the simulated pulse logic, or both, prevents the train of simulated pulses from gradually drifting away from the true location points of the timing marks 18 on the document.

On the other hand, should the pulse from the detection of an actual timing mark 18 by photo transistor 20 arrive at OR gate 40 before the row-simulator counter 34 accumulates the count necessary to generate a simulated row pulse, the simulated row pulse will not be generated at all, since the row-simulator counter 34 will be zero-reset by the direct pulse from photo transistor 20 that is gated through OR gate 40. In this instance, the row-simulator counter 34 will be zero reset only once for that particular data row. Because zero-reset of row-simulator counter 30 always occurs from the time reference point of a timing mark 18 that is actually detected, the system also limits to a safe level the effects of error that might otherwise occur if the row time counter 30 produces an excessively high or excessively low count due to "doodling" in the area of the timing track marks 18 for data rows 1 and 2. For example, if a doodle is made in the timing track 16 so that the timing marks 18 for data rows 1 and 2 are widened, thus narrowing the space between them, there would be a low-count error in the timing determined by the row-time counter 30. On the other hand, if a slightly larger than normal reference count is made by the row-time counter 30 between data rows 1 and 2, there will be a high-count error and the timing marks 18 will be detected ahead of the generation of the pulse by the simulated logic. If this occurs, the actual timing marks 18 (in the absence of doodles) will be used both for resetting the row-simulator counter 34 before a simulated pulse can be generated and for actuation of the scan logic through the pulse priority detector 38. Thus, if a pulse produced by actual detection of a timing mark 18 clears the acceptance window 42 (as described hereinafter) it will always zero reset row-simulator counter 34 and destroy any count accumulated in counter 34 whether or not the actual pulse is used to activate the scan logic through priority detector 38. Thus, the system of the invention provides the best possible synchronization of the "read" signals to the scanner with the actual timing marks 18 on the sheet.

The system also minimizes errors that can occur from other sources which cannot be completely eliminated. For example, there can be minor density variations in the printing of the timing track marks 18, random reflectance variations in the paper stock of the document, and some signal variations caused by the document "fluttering" beneath the scan head. All of these variables produce plus or minus tolerance variations or "jitter" in the stored count of row-time counter 30 and also "jitter" in the generation of the pulses by the direct pulse logic when a timing mark 18 is actually detected. There is, therefore, provided in the system the acceptance window gate 42, the function of which is to allow a detected timing mark 18 to be used to actuate the scan logic and to reset the row-simulator counter 34 only if a timing mark 18 is detected within a relatively narrow row-percentage band or "window" from the theoretically correct center timing point as determined with reference to the reference pulse count generated between data rows 1 and 2. Typical settings for the acceptance window gate 42 are plus or minus 10–15 percent of a given reference count. If due to one or more of the variables a slightly less than normal reference pulse count is made by the row-time counter 30, the simulated row pulse produced by comparative logic 36 will tend to be generated slightly ahead of the actual timing mark 18. In the absence of any "doodles," the pulse produced by actual detection of a timing mark 18 will clear the acceptance window gate 42 if it is within the set limits. This pulse will also clear out any partial count that may have reaccumulated in the counter 34 after the simulated pulse has been used to reset the row-simulator counter 34. This, therefore, keeps the simulated row pulses in close cynchronization with the actual timing marks 18.

The control logic and timing of the acceptance window gate 42 is determined by use of a decoder 44 that decodes predetermined counts in the row-time counter 34. If an excessive count error is made by the row time counter 30 due to "doodling" in the area of the timing marks for data rows 1 and 2, the acceptance window gate 42 will be error-shifted excessively with respect to the actual true location of the remaining timing marks 18. Accordingly, detection of the remaining timing marks 18 by photo transistor 20 will not be gated through the acceptance window gate 42. If a predetermined number of consecutive timing marks 18 are not gated through window gate 42 a doodle-limit error signal is generated by error limit counter 46 to indicate that there is a problem with the particular document. This limit is typically set at five or six, and when the limit is reached a signal will be produced by counter 46 that can be used to shut down the system. The "quality" of the count made by the row time counter 30 between the timing marks 18 for data rows 1 and 2 determines to some extent how many "consecutively doodled" data rows can be corrected by the pulse from the simulated pulse logic before the synchronization drift produces an unacceptable magnitude of error. The worst magnitude of error (row percentagewise) is the product of the present percentage limit of the acceptance window gate 42 and the number of consecutively missed actual row pulses permitted by error limit counter 46. This product is typically set for a cumulative error limit of about 50 percent implying a typical error limit correction capability of five consecutive "doodles," assuming the limits of window gate 42 are plus or minus 10 percent. Ideally, the "window" of gate 42 should be narrow so as to correct the maximum number of consecutive doodles. But because of "jitter" affecting the reference sample count and actual pulse reading, documents without any doodles would be routinely rejected. Therefore, the "window" must be wide enough (10–15 percent) to accept pulses and yet allow the maximum number (3 to 5) of consecutive rows to pass before the error limit of counter 46 is reached.

Moreover, the lower the "quality" of the count sample made by the row time counter 30 between the timing marks 18 and data rows 1 and 2, the smaller the number of "consecutively doodled" timing marks 18 that can be corrected before the synchronization error will be of a magnitude to trigger the limit of error limit counter 46. For example, assuming the error limit counter 46 is set for six, and if the presence of a large "doodle" requires the system to supply five consecutive simulated-row pulses through the pulse priority detector 38 to the scan logic, the next timing mark 18 that is detected by photo transistor 20 must clear the acceptance window gate 42 or the row-simulator counter 34 will not be resynchronized and error limit counter 46 will reach six and shut down the system. If the accumulated synchronization drift over these five "doodled" rows (combined with the normal "jitter") is such that the first timing mark 18 that is actually detected following the doodles does not clear the window of gate 42, then the affect on the logic is the same as if the doodle were continued for six consecutive rows. If the error limit counter 46 is not provided in the system, this process will continue for each additional timing mark 18 that is actually detected but fails to clear the acceptance window gate 42. Thus, the logic system, once too far out of synchronization because of too many consecutive missed actual row pulses due to doodles, cannot get back into synchronization when the first actual row pulse appears at the gate 42 since it will miss the "window" of gate 42. This occurs because the acceptance "window" of gate 42 is in time synchronization with the simulated-row pulses produced by the simulated pulse logic. The error limit counter 46 therefore provides for a positive warning if either the predetermined number of consecutive doodles occurs in the timing track 16 or after one or more doodles the actual pulses fail to clear the window of gate 42 because of a poor quality sample madein the reference count by counter 330 between rows 1 and 2. In other words, there is a preset absolute limit of simulated pulses which will shut down the system regardless of cause whenever that limit is reached in counter 46. However, if the actual pulses clear the window of gate 42 and therefore resynchronize the system by resetting counter 34, there can be a high number of nonconsecutive doodles on any one document without affecting the accuracy or speed of the "reading" of the document.

As indicated by the foregoing description, the system of the invention reduces the number of documents rejected because of "doodling" in the area of the timing mark track 16. The system which has been described herein as the preferred embodiment will obviously not eliminate all of the problems caused by doodling, but will greatly minimize them. There are, however, variations of the preferred embodiment which can be used in the system if it is desired to reduce further the problems caused by doodling. Although the system is self-synchronizing, the effects of detection-jitter can reduce the quality of the count sample made between data rows 1 and 2. For example, by additional logic hardware, the row time counter 30 can be set to accumulate the pulses from reference oscillator 28 between data rows 1 and 3 with a logic-shift command being used to divide the accumulated count by 2 thus producing an average value of row time measurement that will generally be closer to the true center-line value than the measurement taken over a single space between two data rows. Of course, this averaging concept can be expanded and applied over more than two row spaces, the practical limitations being complexity of the logic hardware with resulting expense. To be effective, it also would require more timing marks 18 to be free from doodles near the lead edge of the sheet.

It is eveident that the successful operation of the system of the preferred embodiment of the invention is dependent upon the absence of doodles in the area between the timing marks 18 for data rows 1 and 2. However, the "doodle free" requirement near the lead edge of the document can be eliminated entirely if the input count to the row time counter 30 and row-simulator counter 34 is derived from a source external of the document. For example, pulses could be produced from an electro-mechanical tachometer-type pulse generating device (not shown) attached to one of the drive capstans (not shown) in the paper conveying system of the scanner. Such devices are well known and can be of the optical disc, magnetic gear or shaft-encoder type. Since the drive capstan is in direct contact with the surface of the document, a given amount of angular rotation of the drive capstan is directly proportional to a given amount of document travel. This thus provides a source of pulses whose repetition rate is proportional to the capstan rotation and thereby directly proportional to the distance of document travel per unit time. This type of a system would produce a stored pulse count independent of the document speed, the pulse count between the data rows 1 and 2 being a function only of the document row spacing and the equivalent pulses-per-inch rate of the pulse generator. Since the pulse count for the row time counter 30 can be predetermined for a given document row spacing, the count may be prestored in counter 30 by means of logic input preset commands rather than actually counting the pulses dynamically during the document lead edge time. In this modified version of the system, the row-simulator counter 34 is connected in the system to start counting the external source reference pulses as soon as the first timing mark 18 for data row 1 is detected. With this modified system, documents having different row spacings can be handled by merely changing the value of the predetermined count in the row time counter 30. This requirement does not ordinarily create problems in processing documents since documents with the same row spacing are generally processed in large groups rather than intermixed. With the system of the preferred embodiment, however, the change from one document row spacing to another is fully automatic in adjusting for the different row spacing.

As indicated by the sample document format for the timing track 16 as shown in FIG. 1, the timing track does not begin at the lead edge of the document but rather is spaced from the lead edge. This is done in order to simplify the printing of the documents, and also because the lead edge of the sheet sometimes is damaged in handling which could affect the timing track 16 if printed up to the lead edge. This format, of course, permits doodling between the lead edge of the document and the first timing mark 18 for data row 1. Therefore, in order to further minimize the processing problems caused by such doodling, it is possible to incorporate into the system of the preferred embodiment a lead edge inhibit gate (not shown) which inhibits the input to the amplifier 22 until just before the first timing mark 18 is to be detected. This gate is triggered from the document lead edge detection logic, and remains active for the time-equivalent distance slightly less than the actual distance on the document between its lead edge and the first timing mark 18. With the use of this inhibit gate, any "doodle" that is present between the lead edge of the document and the first timing mark 18 is automatically blocked from issuing false synchronization pulses to the scan logic.

It will be obvious to those skilled in the art that additional revisions and modifications can be made to the preferred embodiment described herein without departing from the spirit and scope of the invention. It is my intention, however, that all such revisions and modifications as are obvious to those skilled in the art, will be included within the scope of the following claims.

I claim:

1. In an apparatus for processing data contained in data response areas on a document or the like moving along a path through said apparatus and which document has a series of linearly equally spaced-apart timing marks each of which normally causes the activation of one or more data sensors so as to read said data response areas, the combination of: data sensors for reading bits of data contained in said data response areas as the document moves along said path by said data sensors, a timing mark sensor positioned so that said timing marks pass serially by it as said document moves along said path through said apparatus, said timing mark sensor causing a signal to be produced when a timing mark is sensed which signal can be utilized to actuate said data sensors, simulator means for repeatedly producing a signal that is in timed relationship to and simulates the signal produced by said timing mark sensor when it detects a timing mark, and a pulse priority detector for receiving the signals produced by said timing mark sensor and said simulator means and producing an output only at the time when the first of said signals is received.

2. In the apparatus of claim 1 in which said simulator means includes a pulse producing means for producing pulses at a regular predetermined rate, means to determine the number of pulses equivalent to the distance between two adjacent timing marks, and means to produce an output signal each time said pulse producing means produces said number of pulses.

3. In the apparatus of claim 2 in which there is provided means to start counting pulses produced by said pulse producing means when the first of said timing marks is detected by said timing mark sensor, means to stop counting said pulses when the second of said timing marks is detected, and means to compare said pulse count between the first and second timing marks with pulses produced by said pulse producing means and to produce an output signal each time said pulse count is again produced by said pulse producing means.

4. In the apparatus of claim 3 in which there is provided means to store the pulse count between the first and second timing marks, counter means is provided to count the pulses produced by said pulse producing means after detection of said second timing mark, and means is provided to compare said stored count with the count accumulated by said counter means and to produce an output signal when the count in said counter means reaches the count of said stored count.

5. In the apparatus of claim 4 in which said counter means is reset to zero count each time an output signal is produced either by said simulator means or by said timing mark sensor.

6. In the apparatus of claim 4 in which there is provided gate means between the output of said timing mark sensor and the input of said pulse priority detector, said gate means setting a predetermined range that is an absolute percentage of the time of each signal produced by said simulator means, said gate means providing an output to said pulse priority detector only when the output of said timing mark sensor is within said range.

7. In the apparatus of claim 6 in which said counter means is reset to zero each time an output signal is produced by said simulator means or by said gate means.

8. In the apparatus of claim 6 in which there is provided an error limit counter, said counter being connected to the output of said simulator means and producing an output signal whenever a predetermined number of outputs are received from said simulator means, and said error limit counter being also connected to the output of said gate means, said counter being reset to a zero count each time an output is received from said gate means.

9. In the apparatus of claim 1 in which there is provided gate means between the output of said timing mark sensor and the input of said pulse priority detector, said gate means setting a predetermined range that is an absolute percentage of the time of each signal produced by said simulator means, said gate means providing an output to said pulse priority detector only when the output of said timing mark sensor is within said range.

10. In the apparatus of claim 9 in which said counter means is reset to zero each time an output signal is produced by said simulator means or by said gate means.

11. In the apparatus of claim 9 in which there is provided an error limit counter, said counter being connected to the output of said simulator means and producing an output signal whenever a predetermined number of outputs are received from said simulator means, and said error limit counter being also connected to the output of said gate means, said counter being reset to a zero count each time an output is received from said gate means.

* * * * *